United States Patent [19]

Harrison

[11] Patent Number: 4,576,401
[45] Date of Patent: * Mar. 18, 1986

[54] LEAK REPAIR CLAMP

[75] Inventor: George W. Harrison, Houston, Tex.

[73] Assignee: Team, Inc., Houston, Tex.

[ * ] Notice: The portion of the term of this patent subsequent to Oct. 16, 1996 has been disclaimed.

[21] Appl. No.: 650,842

[22] Filed: Sep. 17, 1984

Related U.S. Application Data

[63] Continuation-in-part of Ser. No. 925,425, Jan. 17, 1978, abandoned, which is a continuation-in-part of Ser. No. 832,112, Sep. 12, 1977, Pat. No. 4,049,296.

[51] Int. Cl.$^4$ ............................................. F16L 55/18
[52] U.S. Cl. ...................... 285/15; 285/110; 285/294; 285/368; 285/373; 277/72 FM; 277/236; 138/99
[58] Field of Search ................... 285/15, 373, 112, 10, 285/105, 294, 111, 110, 297, 368; 277/236, 212, 79, 212 C, 72 FM; 138/99

[56] References Cited

U.S. PATENT DOCUMENTS

| | | | |
|---|---|---|---|
| 333,011 | 12/1885 | Hoeveler | 285/297 X |
| 549,594 | 11/1895 | Cooper et al. | 285/112 X |
| 1,590,580 | 6/1926 | Hume | 285/10 |
| 2,157,299 | 5/1939 | Mercier | 277/21 LF X |
| 2,405,152 | 8/1946 | Kilchenmann | 277/236 X |
| 2,463,235 | 3/1949 | Andrews | 285/105 |
| 2,778,662 | 1/1957 | Smith | 285/373 X |
| 2,784,991 | 3/1957 | Newell et al. | 285/373 |
| 3,550,638 | 12/1970 | Smith | 130/99 |
| 3,770,301 | 11/1973 | Adams | 285/15 |
| 3,954,288 | 5/1976 | Smith | 285/373 X |
| 4,049,296 | 9/1977 | Harrison | 285/15 |
| 4,171,142 | 10/1979 | Harrison | 285/15 X |
| 4,240,650 | 12/1980 | Adams | 285/15 X |

FOREIGN PATENT DOCUMENTS

| | | | |
|---|---|---|---|
| 522162 | 3/1921 | France | 285/112 |
| 959161 | 9/1949 | France | 277/212 C |
| 149071 | 8/1920 | United Kingdom | 277/79 |
| 323252 | 12/1929 | United Kingdom | 285/112 |
| 523387 | 7/1940 | United Kingdom | 285/294 |
| 708521 | 5/1954 | United Kingdom | 285/111 |

Primary Examiner—Dave W. Arola
Attorney, Agent, or Firm—Guy E. Matthews

[57] ABSTRACT

A leak repair clamp for pipe and pipe flanges includes a frame having a plurality of one piece frame segments positionable in end-to-end relationship around the pipe. Each segment includes a pair of spaced apart metal lips which are adapted to form a metal-to-metal seal with a pipe or flanges when the frame segments are connected together. Access means are provided in each frame segment to permit the passes of liquid sealant into the recess defined by the lips and the pipe.

5 Claims, 3 Drawing Figures

LEAK REPAIR CLAMP

CROSS REFERENCE TO RELATED APPLICATIONS

This application is a continuation-in-part of application Ser. No. 925,425, filed Jan. 17, 1978 now abandoned, which is a continuation-in-part of application Ser. No. 832,112, filed Sept. 12, 1977, and now Pat. No. 4,049,296.

BACKGROUND OF THE INVENTION

This invention relates generally to means for repairing pipeline leaks and, more particularly, to a leak repair clamp for sealing leaking flange pipe couplings, valve bonnet flanges, or leaks through the exterior of a pipe wall.

Flange pipe couplings are widely used for connecting sections of pipe which operate in moderate to high pressures. Various configurations of seals are utilized between the flanges. One of the most common configurations is a raised face on the inner portion of each of the flanges with an annular gasket being placed between the raised faces. When the flanges are bolted together the raised flanges compress the gasket material to form a seal.

Leaks often begin in such flange pipe couplings because of deterioration of the gasket material, shifting of the pipe, and for other reasons. Similarly, a leak may occur in the outer wall of a pipe section due to a defect in the manufacture of the pipe because of damage done to the pipe during or after installation. Such leaks must be repaired and often in the past the pipeline had to be shut down and drained of its contents before repair could be effected.

Pipe flanges repair clamps and seals for sealing the leak between pipe flanges are known in the prior art. Some examples of references detailing the state of and level of skill in the art are disclosed in U.S. Pat. Nos. 459,594: 866,395; 1,590,580; 2,157,299; 2,405,152; 2,463,235; 2,778,662; 2,784,991; 3,152,816; 3,550,638; 3,770,301; 3,954,288; 4,049,296; 4,171,142; and 4,240,650. Also of interest are British Pat. Nos. 149,071, 323,252, 523,387, 708,521; and French Pat. Nos. 522,162 and 959,161.

Some of the pipe flanges repair clamps, however, are extremely complex and have a number of movable and adjustable parts that make the clamp expensive and difficult to utilize. Moreover, such pipe flange repair clamps mormally embody an elastomeric material for centering the clamps around the pipe, pipe flanges and the like which also provide an initial sealing arrangement between the pipe and clamp. Such elastomeric seals are fine in most situations, but may be adversely affected in certain situations, such as when the leaking fluid is and acid or at a high temperature and pressure which effects the life of the material. To solve some of these problems, the elastomeric material can be specially selected, but this does not solve the compression set properties of the material which leads to seal failure.

Accordingly, one of the primary objectives of the present invention is to provide a repair clamp for pipe and pipe flanges and the like which utilize a self-energizing seal.

Another object of the present invention is to provide a leak repair clamp for pipe and pipe flanges and the like that centers the clamp around the pipe when connected thereto.

Another object of the present invention is to provide a leak repair clamp for pipe and pipe flanges and the like that receives a liquid sealant and directs the flow of the liquid sealant into contact with the pipe to thereby provide a self-energizing seal between the clamp and the pipe.

another feature of the present invention is to provide a repair clamp for pipe and pipe flanges and th like that utilizes a lip which is an integral part of the clamp and formed to direct a liquid sealant into contact with the pipe.

Yet another feature of the present invention is to provide a simple clamp that can be utilized with minor modifications for sealing leaks in pipelines and pipeline sections and flanges.

Still another feature of the present invention is to provide a repair clamp having metal lips adapted to deform to form a metal-to-metal seal with the pipe or pipe flanges.

Still a further object of the present invention is to provide a repair clamp having no external housing in surrounding relationship therewith.

SUMMARY OF THE INVENTION

The present invention remedies the problem of the prior art by providing a leak repair clamp for pipe and pipe flanges, valve bonnet flanges and the like. The clamp includes a circular clamp frame made up of at least two frame segments positionable in end-to-end relation about the pipe. Each segment has spaced, parallel, annular, deformable, metal lips flaring from it inner periphery with each lip being an integral part of the segment and having a tip portion bent to extend toward the other tip portion of the oppositely positioned space annular lip. Flanges are used to connect the frame segments to one another when positioned in end-to-end relation so that the spaced annular lips extending longitudinally on the interior of each pipe segment aligns with the next adjacent end-to-end lip to form a pair of circumferential spaced lips having a recess therebetween defined by the interior of the flange segments, the lips and the pipeline member. Access means are provided in the frame to permit passage of a curable liquid sealant into the recess with the lips being used to direct flow of the sealant into contact with the pipe to form a self-energizing seal between the lips and pipe.

BRIEF DESCRIPTION OF THE DRAWINGS

Other objects and advantages ot the invention will become apparent upon reading the following detailed description, and upon reference to the drawings, in which:

FIG. 3 is an enlarged fragmentary vertical cross-sectional view of the leak repair clamp shown in FIGS. 1 and 2 illustrating a self-energizing, metal-to metal seal between the lips and pipe, pipe flanges, valve bonnet flanges and the like.

While the invention will be described in connection with a preferred embodiment, it will be understood that it is not intended to limit the invention to this embodiment. On the contrary, it is intended to cover all alternative, modifications and equivalents as may be included within the spirit and scope of the invention as defined by the appended claims.

DETAILED DESCRIPTION OF THE INVENTION

Figure 1:
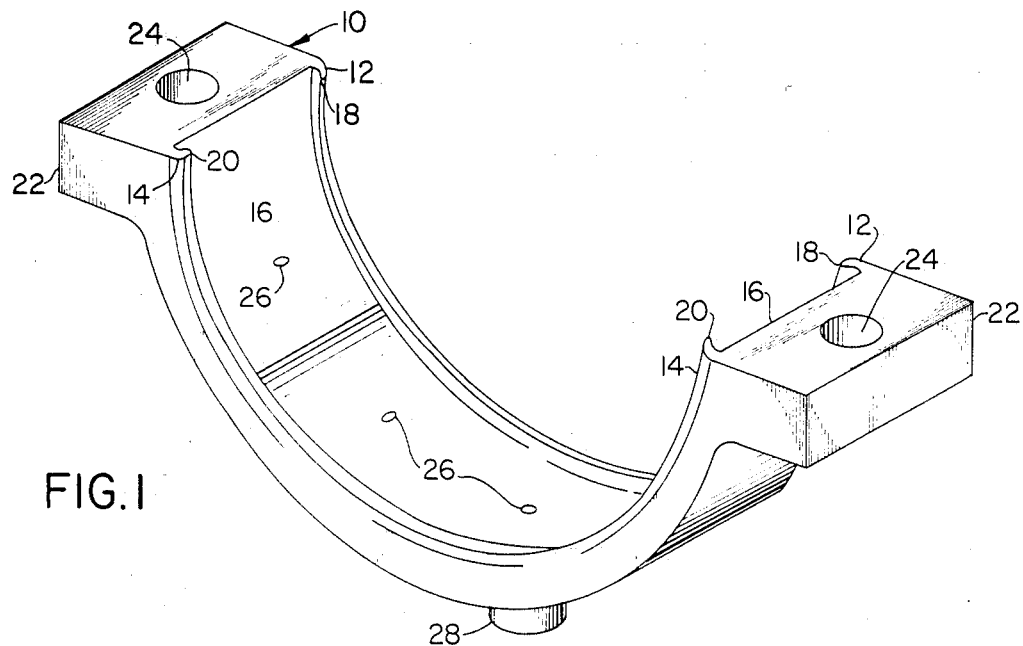
FIG. 1 is a perspective view of a frame segment used in a leak repair clamp constructed according to the present invention.

Referring now in FIG. 1, a perspective view of a portion of a leak repair clamp constructed according to the present invention for pipe and pipe flanges and the like is shown. The clamp comprises a circular frame constructed from a plurality of frame segments 10 which are positionable in end-to-end relation about the pipe and pipe flanges and the like, and which are preferably semi-circular in shape. Each segment 10 has spaced parallel annular lips 12 and 14 that flare from the inner periphery 16. Each lip 12 and 14 is an integral part of each segment 10 and each lip has respectively a tip portion 18 and 20 bent over in order to extend toward the other tip portion. That is, the first tip portion 18 of first lip 12 is bent over to extend toward the tip portion 20 of second lip 14 and the tip portion 20 is bent over in order to extend toward the lip 12.

Means are mounted to each segment 10 for connecting the frame segments to one another when positioned in end-to-end relation. Preferably, this connecting means is an end flange 22 positioned on each end of semi-circular frame segment 10 which has apertures or bolt holes 24 extending therethrough. Thus, when connecting segments 10 to one another, the spaced lips 12 and 14 extend from frame segments 10 to form an annular recess around the pipe and pipe flange and the like.

Access means are provided in the frame for permitting passages of a liquid sealant into the recess. Preferably, the access means are provided in each frame segment 10, and is a plurality of radial ports or passageways 26 extending from the outside of the segment to the recess with a nipple 28 for each port 26 mounted to the segment. As liquid sealant is injected into the recess, lipa 12 and 14 direct or channel the flow into contact with the pipe and pipe flange and the like to form a self-energizing seal between the lips and pipe. This is, the sealant will force lips 12 and 14 into stronger engagement with the pipe and pipe flanges and the like when the leak pressure pushes against the sealant.

Figure 2:
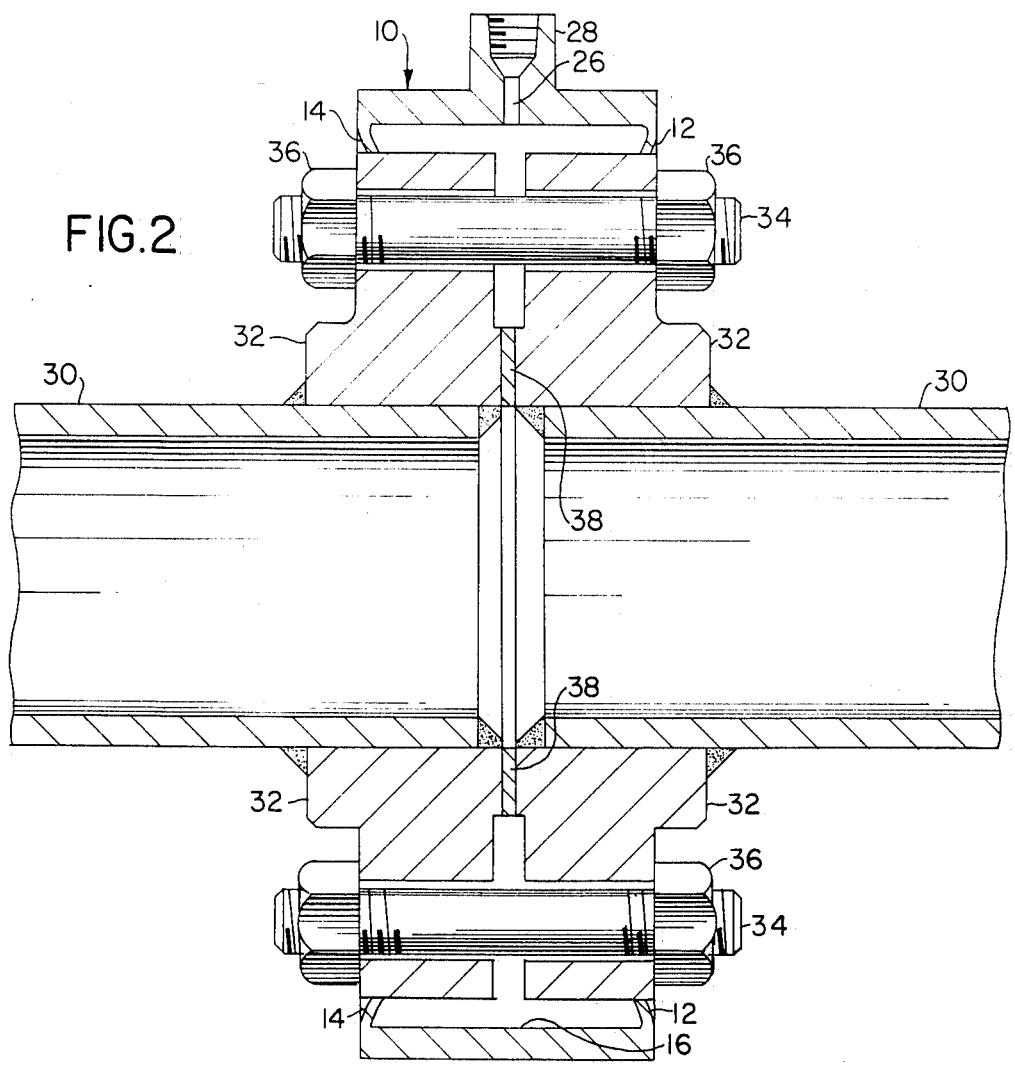
FIG. 2 is a detailed vertical cross-sectional view of a leak repair clamp constructed according to the present invention mounted on a pipeline to seal a pipe flange leak.
Figure 3:
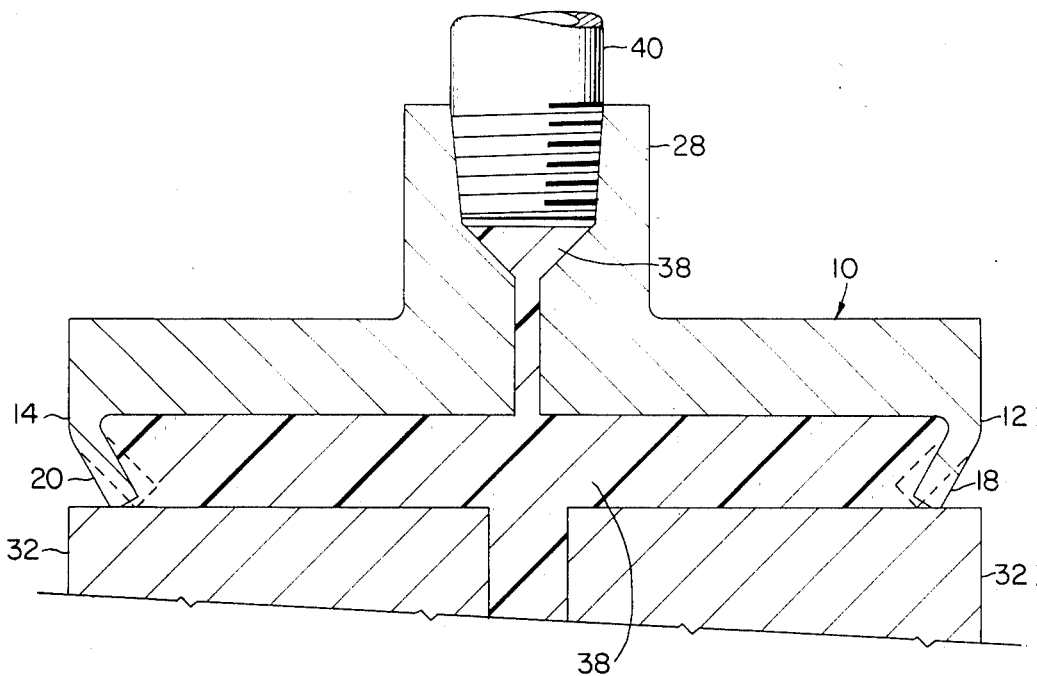

As shown in FIG. 2, the leak repair clamp of FIG. 1 is shown positioned in end-to-end relation about a pipeline 30 and, more specifically, about adjacent abutting pipe flanges 32. Flanges 32 of pipe 30 are held securely together by means of a flange bolt 34 and flange bolt nuts 36. A flange gasket 38 is located between the raised end faces of flanges 32 and compressed therebetween for sealing the two pipeline sections 30 together. If a leak develops through gasket 38, the leak repair clamp seals such leak when positioned about the flanges as illustrated. Frame segments 10 are positioned and centered about the periphery of adjacent pipe flanges 32 with tip portions 18 and 20 of spaced annular lips 12 and 14 in contact with the outer surface of pipe flanges 32. Bolts 34 are extended through holes 24 and nuts 36 screwed thereto for bringing the end faces of segments 10 into forceful sealing engagement and effectuate a sealed annular recess between lips 12 and 14 enclosing pipe flanges 32. Since tip portions 18 and 20 of lips 12 and 14, respectively, extend toward the other tip portion, the tightening of nuts 36 on bolts 34 causes lips 12 and 14 to be deflected, with the annular edges of the clips into direct sealing engagement as shown in dotted outline in FIG. 3. A curable liquid sealant 38 is then introduced into the annular recess by means of an injecting tip 40 from a pressurized injection system, which is fitted to the threaded end of nipple 28, as shown in FIG. 3. Upon injection into the annular recess, liquid sealant 38 acts on tip portions 18 and 20 to force them outwardly away from one another, as shown by the solidly outlined positions in FIG. 9, which creates a self-energizing seal of lips 12 and 14 against flanges 32 with the addition of the seal formed by sealant 38 after it has had time to cure, and the further addition of the seal formed by the edges of lips 12 and 14 from the forced deflection of the lips when the nuts 36 are tightened.

From the foregoing it will be seen that this invention is one well adapted to attain all of the ends and objects hereinablove set forth, together with other advantages which are obvious and which are inherent to the apparatus.

It will be understood that certain features and subcombinations are of utility and may be employed with reference to other features and subcombinations. This is comtemplated by and is with the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In an improved self-contained leak repair clamp, the combination comprising:
   (a) a circular metal frame formed of at lease two frame segments adapted for forceful connection around and against a cylindrical surface;
   (b) said frame defining two integral deformable metal lips extending radially inwardly and disposed in parallel relation about the inner periphery of each frame segment of said frame to form an annular cavity between said frame and said cylindrical surface;
   (c) each of said metal lips being adapted to be deformed inwardly toward the other of said lips in response to said forceful connection to form a respective fluid tight seal between an edge of each said metal lip and said cylindrical surface;
   (d) said sealing force of each said respective fluid tight seal being adapted to be increased in response to fluid pressure applied to within said annular cavity;
   (e) said annular cavity being adapted to receive a liquid sealant cured while under fluid pressure to form a seal between said lips in addition to each said respective seal; and
   (f) means for forcefully connecting said frame segments together to form said circular metal frame and said sealed annular cavity.

2. The clamp of claim 1 further including a liquid sealant contained within said annular cavity and cured while under fluid pressure to form a fluid tight seal between said lips in supplement to said respective fluid tight seal.

3. The clamp of claim 1 including means for injecting and retaining and said liquid sealant under fluid pressure within said annular cavity for curing.

4. The clamp of claim 1 wherein said frame segments include flange means connected together with threaded connector means.

5. The clamp of claim 1 wherein said frame segments are sealed together by said forceful connection.

* * * * *